(12) United States Patent
Hyun et al.

(10) Patent No.: US 11,624,207 B2
(45) Date of Patent: Apr. 11, 2023

(54) SMART KEY FOR VEHICLE

(71) Applicant: HONDA MOTOR CO., LTD., Tokyo (JP)

(72) Inventors: YoungJin Hyun, Singapore (SG); JiYong Ahn, Singapore (SG)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 16/764,458

(22) PCT Filed: Nov. 23, 2018

(86) PCT No.: PCT/IB2018/059260
§ 371 (c)(1),
(2) Date: May 15, 2020

(87) PCT Pub. No.: WO2019/102413
PCT Pub. Date: May 31, 2019

(65) Prior Publication Data
US 2020/0362590 A1    Nov. 19, 2020

(30) Foreign Application Priority Data

Nov. 23, 2017    (KR) .................. 10-2017-0157414

(51) Int. Cl.
*E05B 19/00*    (2006.01)
*B60R 25/22*    (2013.01)
(Continued)

(52) U.S. Cl.
CPC .......... *E05B 19/0082* (2013.01); *B60R 25/22* (2013.01); *B60R 25/24* (2013.01); *G06K 19/077* (2013.01)

(58) Field of Classification Search
CPC ..... E05B 19/0082; B60R 25/22; B60R 25/24; G06K 19/077
See application file for complete search history.

(56) References Cited

U.S. PATENT DOCUMENTS

| 5,552,240 A | 9/1996 | Derstine |
| 6,553,802 B1 | 4/2003 | Jacob |
(Continued)

FOREIGN PATENT DOCUMENTS

| CN | 103198537 A | 7/2013 |
| CN | 203774394 U | 8/2014 |
(Continued)

OTHER PUBLICATIONS

Office Action dated Oct. 21, 2021 issued in co-pending U.S. Appl. No. 16/764,441.
(Continued)

*Primary Examiner* — Nay Tun
(74) *Attorney, Agent, or Firm* — Carrier Shende & Associates, P.C.; Joseph P. Carrier; Fulchand P. Shende

(57) ABSTRACT

The present invention relates to a smart key for a vehicle including a substrate part on which components are mounted, a key accommodation part formed on the substrate part and into which an auxiliary key part is inserted, a reinforcement part coupled to the substrate part and augmenting rigidity, and a case part covering the substrate part, the key accommodation part, and the reinforcement part to augment the rigidity thereof.

8 Claims, 4 Drawing Sheets

(51) Int. Cl.
    *B60R 25/24*     (2013.01)
    *G06K 19/077*     (2006.01)

(56) References Cited

U.S. PATENT DOCUMENTS

| | | | | |
|---|---|---|---|---|
| 6,647,752 | B1 * | 11/2003 | Chaillie | E05B 19/0082 |
| | | | | 70/459 |
| 7,227,446 | B2 * | 6/2007 | Kumazaki | G07C 9/00309 |
| | | | | 340/5.6 |
| 7,448,238 | B2 | 11/2008 | Shimura et al. | |
| 7,664,470 | B2 | 2/2010 | Sugimoto et al. | |
| 7,664,471 | B2 | 2/2010 | Sugimoto et al. | |
| 7,923,647 | B2 | 4/2011 | Murakami et al. | |
| 8,009,410 | B2 * | 8/2011 | Goemmel | E05B 19/0082 |
| | | | | 361/679.01 |
| 8,061,170 | B2 * | 11/2011 | Calor | E05B 19/043 |
| | | | | 70/459 |
| 8,237,542 | B2 * | 8/2012 | Katagiri | B60R 25/24 |
| | | | | 340/5.6 |
| 8,479,547 | B2 | 7/2013 | Kataya et al. | |
| 8,540,165 | B2 * | 9/2013 | Foo | G06Q 20/341 |
| | | | | 235/492 |
| 8,953,331 | B2 * | 2/2015 | Sugimoto | E05B 19/0082 |
| | | | | 361/764 |
| 8,976,535 | B2 * | 3/2015 | Paek | G07C 9/00944 |
| | | | | 361/679.01 |
| 10,994,699 | B2 | 5/2021 | Hyun | |
| 11,077,827 | B2 | 8/2021 | Lee | |
| 2003/0222755 | A1 * | 12/2003 | Kemper | G07C 9/00944 |
| | | | | 340/5.61 |
| 2005/0136852 | A1 * | 6/2005 | Nakagawa | H05K 3/284 |
| | | | | 455/90.3 |
| 2006/0150696 | A1 * | 7/2006 | Eychenne | A45C 11/325 |
| | | | | 70/456 R |
| 2006/0245170 | A1 * | 11/2006 | Sugimoto | G07C 9/00944 |
| | | | | 361/740 |
| 2007/0227866 | A1 * | 10/2007 | Dimig | G07C 9/00944 |
| | | | | 200/302.2 |
| 2009/0145187 | A1 * | 6/2009 | Deppner | G07C 9/00944 |
| | | | | 70/448 |
| 2011/0313595 | A1 * | 12/2011 | Kato | E05B 19/046 |
| | | | | 701/2 |
| 2012/0012659 | A1 * | 1/2012 | Sugimoto | G07C 9/00944 |
| | | | | 235/492 |
| 2012/0092128 | A1 * | 4/2012 | Yamane | E05B 19/0082 |
| | | | | 340/5.64 |
| 2014/0021025 | A1 | 1/2014 | Sersch | |
| 2014/0078689 | A1 * | 3/2014 | Paek | G07C 9/00944 |
| | | | | 264/250 |
| 2014/0363716 | A1 | 12/2014 | Nishida et al. | |
| 2016/0191096 | A1 | 6/2016 | Kishimoto | |
| 2016/0250996 | A1 * | 9/2016 | Park | E05B 19/0082 |
| | | | | 701/2 |
| 2018/0302788 | A1 * | 10/2018 | Konchan | H04B 1/3888 |
| 2020/0296835 | A1 | 9/2020 | Hyun | |
| 2020/0357208 | A1 | 11/2020 | Hyun | |
| 2020/0362590 | A1 | 11/2020 | Hyun et al. | |
| 2020/0362591 | A1 | 11/2020 | Hyun | |

FOREIGN PATENT DOCUMENTS

| | | |
|---|---|---|
| CN | 104080988 A | 10/2014 |
| CN | 104466056 A | 3/2015 |
| CN | 111492410 B | 4/2022 |
| CN | 111630575 B | 5/2022 |
| EP | 0987389 A1 | 3/2000 |
| EP | 3056639 A1 | 8/2016 |
| JP | 2001-250521 A | 9/2001 |
| JP | 2004-131936 A | 4/2004 |
| JP | 2007224664 A | 9/2007 |
| JP | 2009-021106 A | 1/2009 |
| KR | 2006-0113443 A | 11/2006 |
| KR | 20120116563 A | 10/2012 |
| KR | 20130066245 A | 6/2013 |
| KR | 20140013393 A | 2/2014 |
| KR | 101496321 B1 | 2/2015 |
| KR | 20150031894 A | 3/2015 |
| KR | 20150050682 A | 5/2015 |
| KR | 101542857 B1 | 8/2015 |
| KR | 20160139689 A | 12/2016 |
| KR | 20170033204 A | 3/2017 |
| WO | 2017135747 A1 | 8/2017 |

OTHER PUBLICATIONS

International Search Report with Written Opinion of the International Searching Authority, dated Apr. 8, 2019, with respect to International Application No. PCT/IB2018/059260.
U.S. Appl. No. 16/764,416.
U.S. Appl. No. 16/764,441.
Office Action dated Sep. 20, 2022 issued over the corresponding Japanese National Phase Patent Application No. 2020-526938 with the English translation thereof.
Office Action dated May 10, 2022 issued in co-pending U.S. Appl. No. 16/764,416.

* cited by examiner

[FIG. 1]
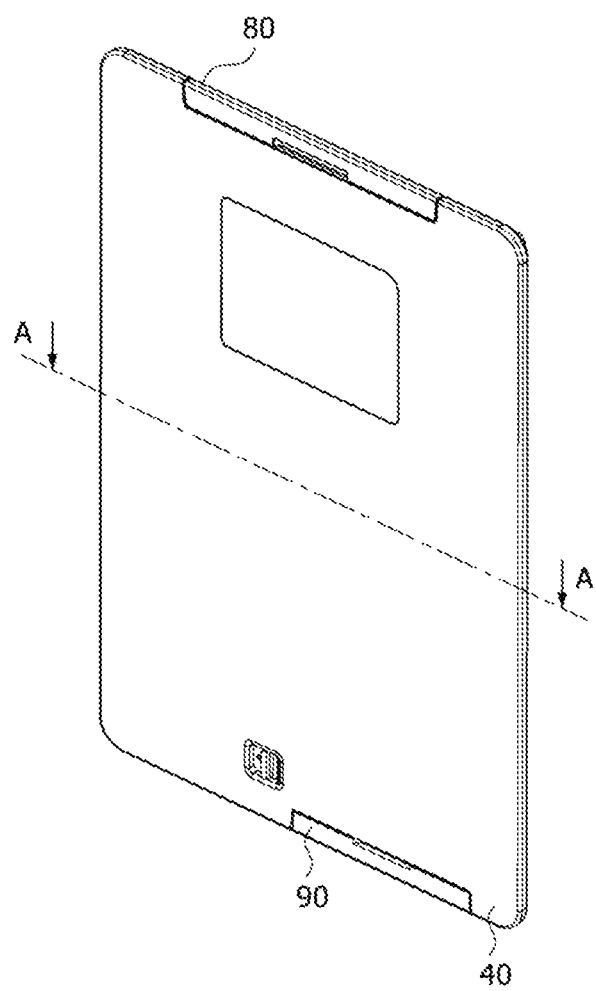

[FIG. 2]
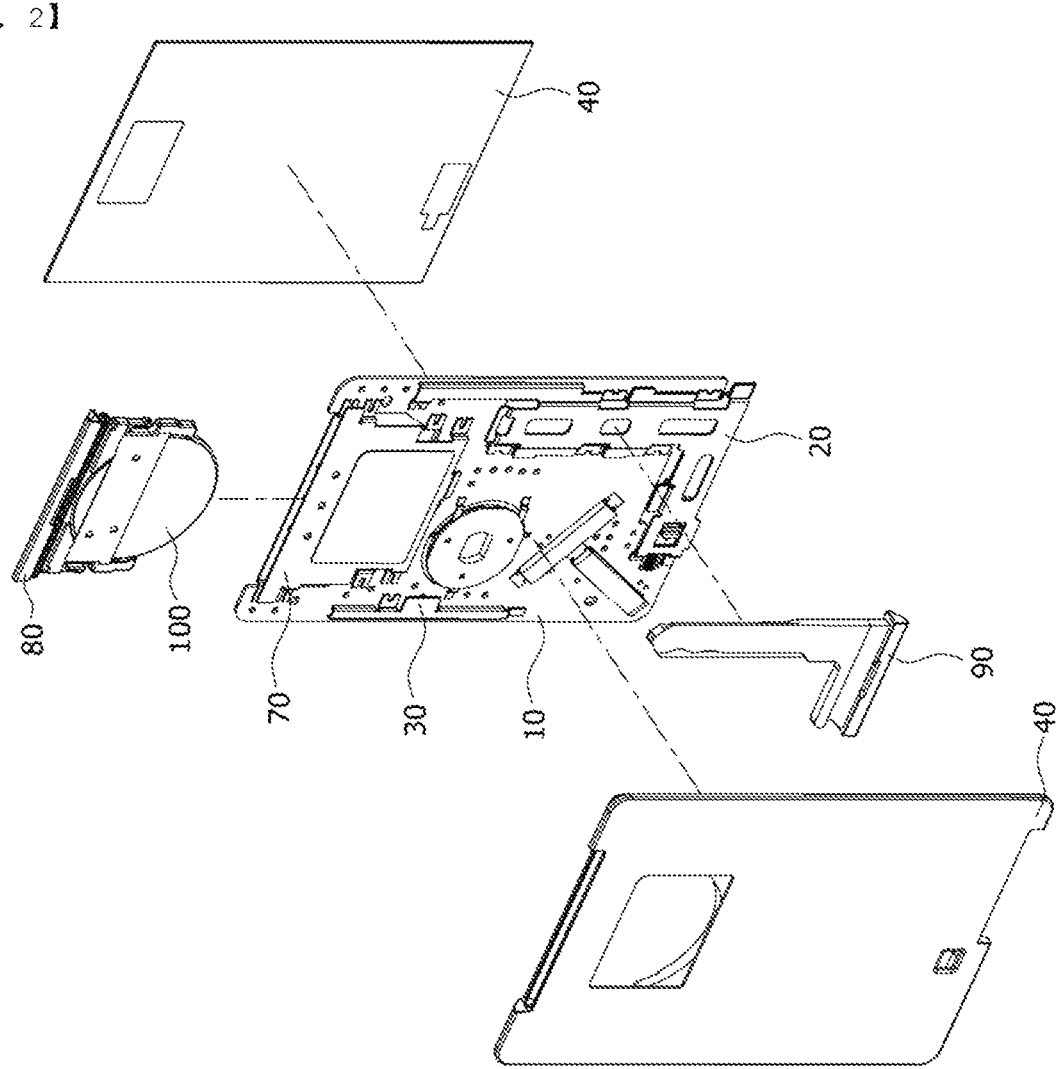

[FIG. 3]
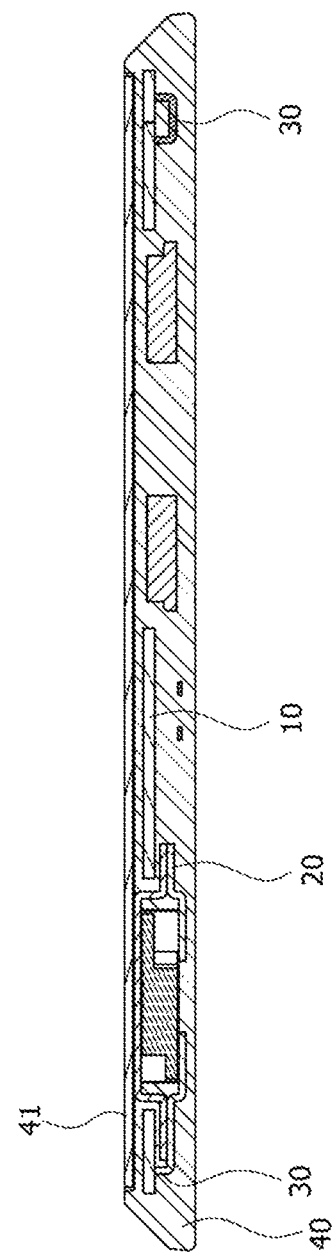

SMART KEY FOR VEHICLE

TECHNICAL FIELD

The present invention relates to a smart key for a vehicle, and more specifically, to a smart key for a vehicle capable of preventing the breakage thereof by maintaining strength even when the thickness thereof is decreased.

BACKGROUND ART

In general, a key for a vehicle for allowing a door of the vehicle to be in a locked state or unlocked state and starting the vehicle includes a typical key of a rod shape and a folding key in which a key blade is folded and inserted into the inside of a key main body.

In addition, recently, a smart key operated by a radio frequency identification (RFID) method in a remote place rather than a method of locking or unlocking a door by directly coupling a key blade of a vehicle to a keyhole of the door is mainly used. However, a typical smart key has a problem in that the rigidity thereof is deteriorated as the smart key is manufactured to be thinner, thereby being vulnerable to bending. Therefore, there is a need for improvement.

The background technology of the present invention is disclosed in Korean Patent Publication No. 2016-0139689 (registered on Dec. 7, 2016, the title of the invention: Slim smart card type of a vehicle).

DISCLOSURE OF THE INVENTION

Technical Problem

The present invention has been derived in order to solve such a problem, and an object of the present invention is to provide a smart key for a vehicle capable of preventing the breakage thereof by maintaining strength even when the thickness thereof is decreased.

Technical Solution

A smart key for a vehicle according to the present invention includes: a substrate part on which components are mounted; a key accommodation part formed on the substrate part and into which an auxiliary key part is inserted; a reinforcement part coupled to the substrate part and augmenting rigidity; and a case part covering the substrate part, the key accommodation part, and the reinforcement part.

The reinforcement part is respectively disposed on both edges of the substrate part, and has a length in the longitudinal direction of the substrate part. The length of the reinforcement part is 20% to 60% of the length of the substrate part. The reinforcement part includes: a reinforcement plate part facing the substrate part; and a reinforcement coupling part extended in the substrate part direction from the reinforcement plate part and coupled to the substrate part.

The reinforcement part further includes a reinforcement extension part extended from the reinforcement plate part and coupled to the substrate part. The reinforcement part further includes a reinforcement adsorption part extended from the reinforcement plate part and by which vacuum adsorption is achieved. The reinforcement part further includes a reinforcement connection part extended from the reinforcement plate part and coupled to the key accommodation part.

Advantageous Effects

In a smart key for a vehicle according to the present invention, a reinforcement part is coupled to a substrate part, so that rigidity may be augmented. In a smart key for a vehicle according to the present invention, a case part is injected and hardened on the outside of a reinforcement part and a substrate part and between the reinforcement part and the substrate part, so that the coupling force therebetween may be augmented.

In a smart key for a vehicle according to the present invention, a reinforcement adsorption part is formed in a reinforcement part, so that an automated process may be achieved.

In a smart key for a vehicle according to the present invention, a reinforcement part is integrally formed with a key accommodation part, so that the production process may be shortened and the rigidity may be augmented with the key accommodation part.

BRIEF DESCRIPTION OF THE DRAWINGS

FIG. 1 is a combined perspective view schematically showing a smart key for a vehicle according to an embodiment of the present invention;

FIG. 2 is an exploded perspective view schematically showing a smart key for a vehicle according to an embodiment of the present invention;

FIG. 3 is a cross-sectional view of A-A of FIG. 1; and

MODE OF IMPLEMENTATION OF THE INVENTION

Figure 4A:
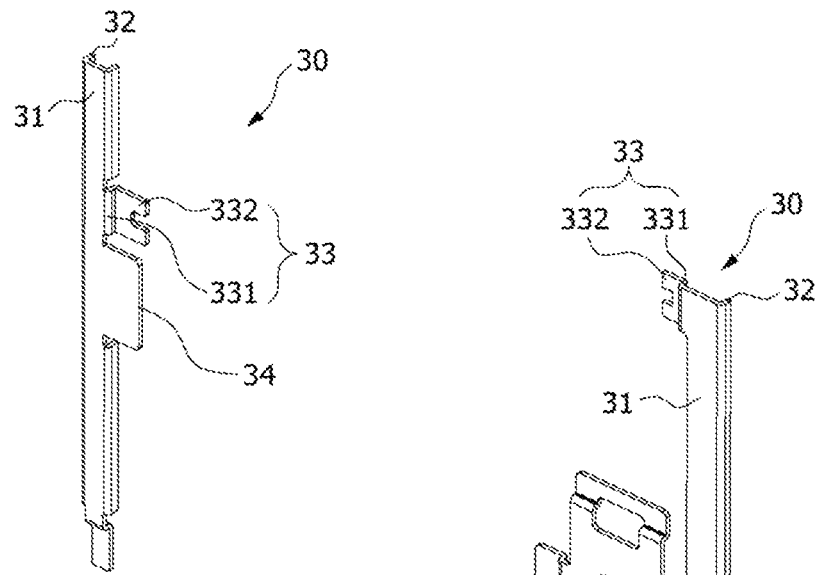
FIGS. 4A and 4B are views schematically showing a reinforcement part in a smart key for a vehicle according to an embodiment of the present invention, in which FIGS. 4A and 4B respectively show two of the reinforcement parts to be provided on opposite side edges of the substrate part.

Hereinafter, an embodiment of a smart key for a vehicle according to the present invention will be described with reference to the accompanying drawings. In this process, the thickness of lines or the size of the components shown in the drawings may be exaggerated for the clarity and ease of understanding of the description. In addition, the following terms are defined in consideration of the functions of the present invention, which may vary depending on the intention or practice of a user or an operator. Therefore, the definition of these terms should be based on the content throughout this specification.

FIG. 1 is a combined perspective view schematically showing a smart key for a vehicle according to an embodiment of the present invention, and FIG. 2 is an exploded perspective view schematically showing a smart key for a vehicle according to an embodiment of the present invention. FIG. 3 is a cross-sectional view of A-A of FIG. 1. Referring to FIGS. 1 to 3, a smart key for a vehicle (1) according to an embodiment of the present invention includes a substrate part (10), a key accommodation part (20), a reinforcement part (30), and a case part (40).

The substrate part (10) is a circuit board which has components mounted thereon, and has a circuit formed thereon for guiding electrical signals of the components. The key accommodation part (20) is formed on the substrate part (10), and has a space into which an auxiliary key part (90) is inserted.

For example, the key accommodation part (20) of a metal material may be coupled to a lower end and a right side end of the substrate part (10). Also, on an upper end of the substrate part (10), a battery accommodation part (70) is formed, and a battery insertion part (80) may be inserted into the battery accommodation part (70). A battery (100) may be mounted on the battery insertion part (80) to apply power to the substrate part (10).

The reinforcement part (30) is coupled to the substrate part (10) to augment rigidity, and the case part (40) covers the substrate part (10), the key accommodation part (20) and the reinforcement part (30).

For example, the substrate part (10) on which the key accommodation part (20) and the reinforcement part (30) are mounted is inserted into a mold and a resin-based liquid is hardened around the substrate part (10) in the mold and formed. The case part (40) may cover left and right sides and an upper side of the substrate part (10). In addition, the case part (40) may cover the key accommodation part (20) and the reinforcement part (30). When the hardening of the case part (40) is completed, a separate sheet part (41) on which a pattern is printed may be attached thereto.

Meanwhile, the reinforcement part (30) is respectively disposed on both edges of the substrate part (10), and has a length in the longitudinal direction of the substrate part (10). For example, either one of the reinforcement parts (30) may be disposed on the opposite side of the key accommodation part (20) and the other reinforcement part (30) may be disposed close to the key accommodation part (20).

The length of the reinforcement part (30) is designed to be 20% to 60% of the length of the substrate part (10). At this time, the reinforcement part (30) is disposed at the central portion of the substrate part (10), and is designed to be 20% to 60% of the length of the substrate part (10), so that the rigidity is maintained and the increase in load may be suppressed.

Figure 4B:
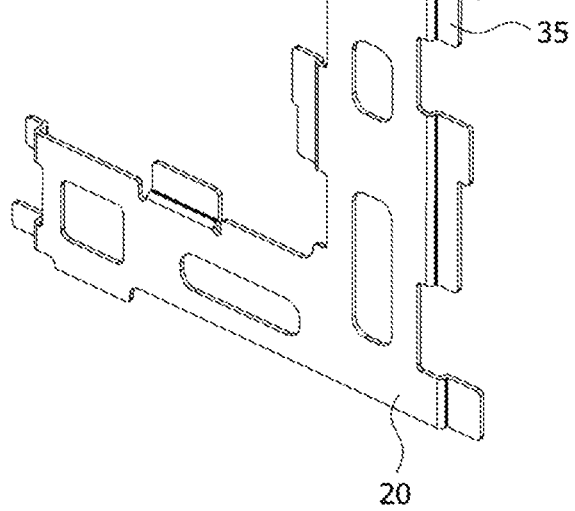

FIGS. 4A and 4B are views schematically showing a reinforcement part in a smart key for a vehicle according to an embodiment of the present invention, in which FIGS. 4A and 4B respectively show two of the reinforcement parts (30) to be provided on opposite side edges of the substrate part. Referring to FIGS. 4A and 4B, the reinforcement part (30) according to an embodiment of the present invention includes a reinforcement plate part (31) and a reinforcement coupling part (32). The above reinforcement part (30) is formed by including a metal material.

The reinforcement plate part (31) has a length in the longitudinal direction of the substrate part (10) and is disposed to face the substrate part (10). For example, the reinforcement plate part (31) may be disposed to be spaced apart from the substrate part (10).

The reinforcement coupling part (32) is extended from the reinforcement plate part (31) in the direction of the substrate (10), and coupled to the substrate part (10). For example, the reinforcement coupling part (32) may be bent from an edge of the reinforcement plate part (31) in the direction of the substrate (10) to be in contact with the substrate (10). The reinforcement coupling part (32) may be coupled to the substrate part (10) by being applied with a surface-mount technology. For example, the reinforcement coupling part (32) may be formed on one edge or on both edges of the reinforcement plate part (31).

The reinforcement part (30) according to an embodiment of the present invention may further include the reinforcement extension part (33). The reinforcement extension part (33) is extended from the reinforcement plate part (31), and coupled to the substrate part (10). For example, the reinforcement extension part (33) is extended from the reinforcement plate part (31) in the lateral direction to be in surface contact with the substrate part (10), and when the reinforcement coupling part (32) is surface-mounted on the substrate (10), the reinforcement extension part (33) may also be surface-mounted on the substrate part (10).

The reinforcement extension part (33) may include an extension protrusion part (331) and an extension plate part (332). The extension protrusion part (331) may be extended from the reinforcement plate part (11) in the direction of the substrate (10). The extension plate part (332) may be extended in the lateral direction from the extension protrusion part (331) and be in surface contact with the substrate part (10). Meanwhile, the extension plate part (332) may be connected to an antenna to improve the radio wave transmission/reception rate.

The reinforcement part (30) according to an embodiment of the present invention may further include the reinforcement adsorption part (34). The reinforcement adsorption part (34) is extended from the reinforcement plate part (31) and by which vacuum adsorption is achieved. For example, the reinforcement adsorption part (34) is extended in the lateral direction of the reinforcement plate part (31) and forms a flat surface, and thus, may be subjected to vacuum adsorption in an automated process.

The reinforcement part (30) according to an embodiment of the present invention may further include a reinforcement connection part (35). The reinforcement connection part (35) is extended from the reinforcement plate part (31), and coupled to the key accommodation part (20). For example, the reinforcement connection part (35) is extended in the longitudinal direction of the reinforcement plate part (31), and may be integrally formed with the key accommodation part (20). Meanwhile, if it is possible to achieve vacuum adsorption of the key accommodation part (20) in an automation process, the reinforcement adsorption part (34) may be omitted in the reinforcement plate part (31) connected to the key accommodation part (20).

An assembling process of a smart key for a vehicle according to an embodiment of the present invention having the above-described configuration will be described as follows.

The key accommodation part (20) and the battery accommodation part (70) are mounted on the substrate part (10) having components mounted thereon, and the reinforcement part (30) is surface-mounted on both edges of the substrate part (10).

When the reinforcement part (30) is mounted on the substrate part (10), the substrate part (10) on which the reinforcement part (30) is mounted is inserted into a mold and a resin-based liquid is injected into the inside of the mold to form the case part (40).

The case part (40) injected into the mold not only covers the outside of the substrate part (10) and the reinforcement part (30), but also fills a space between the substrate part (10) and the reinforcement part (30), so that the coupling force between the substrate part (10), the reinforcement part (30), and the case part (40) is augmented.

Meanwhile, when the reinforcement adsorption part (34) is formed in the reinforcement part (30), an automated robot may vacuum-adsorb the reinforced adsorption part (34) to place the reinforcement part (30) on the substrate part (10) in an automated process.

Furthermore, since the reinforcement extension part (90) extended in the lateral direction from the reinforcement plate part (31) is surface-mounted on the substrate part (10) in a state in which the reinforcement extension part (33) is in surface contact with the substrate part (10), the coupling force between the reinforcement part (30) and the substrate part (10) is augmented.

In a smart key for a vehicle (1) according to an embodiment of the present invention, the reinforcement part (30) is coupled to the substrate part (10) to augment rigidity.

In a smart key for a vehicle (1) according to an embodiment of the present invention, the case part (40) is injected and hardened on the outside of the reinforcement part (30) and the substrate part (10) and between the reinforcement part (30) and the substrate part (10), so that the coupling force therebetween may be augmented.

In a smart key for a vehicle (1) according to an embodiment of the present invention, the reinforcement part (30) is coupled to the substrate part (34) to augment rigidity.

In a smart key for a vehicle (1) according to an embodiment of the present invention, the reinforcement part (30) is integrally formed with the key accommodation part (20), so that the production process may be shortened and the rigidity may be augmented with the key accommodation part (20).

Although the present invention has been described with reference to the embodiments illustrated in the drawings, this is merely exemplary. It will be understood by those skilled in the art that various modifications and equivalent embodiments thereto may be implemented. Accordingly, the true technical protection scope of the present invention should be determined by the following claims.

DESCRIPTION OF THE REFERENCE NUMERALS OR SYMBOLS

10: Substrate part
20: Key accommodation part
30: Reinforcement part
31: Reinforcement plate part
32: Reinforcement coupling part
33: Reinforcement extension part
34: Reinforcement adsorption part
35: Reinforcement connection part
40: Case part
70: Battery accommodation part
80: Battery insertion part
90: Auxiliary key part

The invention claimed is:

1. A smart key for a vehicle comprising:
a substrate part on which components are mounted;
a key accommodation part formed on the substrate part and into which an auxiliary key part is selectively inserted;
a reinforcement part coupled to the substrate part and augmenting rigidity; and
a case part covering the substrate part, the key accommodation part, and the reinforcement per,
wherein the reinforcement part is disposed at one edge of the substrate part, and the reinforcement part comprises:
a reinforcement plate part facing the substrate part;
a reinforcement coupling part extended from the reinforcement plate part toward the substrate part; and
a reinforcement connection part extended from the reinforcement plate part toward the key accommodation part and coupled to the key accommodation part.

2. The smart key for a vehicle of claim 1, wherein the reinforcement part comprises two reinforcement parts which are respectively disposed on two edge portions of the substrate part, and each of the two reinforcement parts has a length extending in a longitudinal direction of the substrate part.

3. The smart key for a vehicle of claim 2, wherein the length of each of the two reinforcement parts is 20% to 60% of a length of the substrate part.

4. A smart key for a vehicle, comprising:
a substrate part on which components are mounted;
a key accommodation part formed on the substrate part and into which an auxiliary key part is selectively inserted;
a reinforcement part coupled to the substrate part and augmenting rigidity; and
a case part covering the substrate part, the key accommodation part, and the reinforcement per,
wherein the reinforcement part is disposed at one edge of the substrate part, and the reinforcement part comprises:
a reinforcement plate part facing the substrate part;
a reinforcement coupling part extended from the reinforcement plate part toward the substrate part; and
a reinforcement connection part extended from the reinforcement plate part toward the key accommodation part and coupled to the key accommodation part, and
wherein the reinforcement coupling part is coupled to the substrate part, and the reinforcement plate part is spaced apart from the substrate part.

5. The smart key for a vehicle of claim 4, wherein the reinforcement part further comprises a reinforcement extension part extended from the reinforcement plate part and coupled to the substrate part.

6. The smart key for a vehicle of claim 4, wherein the reinforcement part further comprises a reinforcement adsorption part extended from the reinforcement plate part and by which vacuum adsorption is achieved.

7. A smart key for a vehicle comprising:
a circuit board on which components are mounted, the circuit board having a first surface;
a key accommodation part attached to the circuit board, and into which an auxiliary key part is selectively inserted;
two spaced apart reinforcement parts coupled to the circuit board for augmenting rigidity; and
a case part covering the circuit board, the key accommodation part, and the reinforcement parts,
wherein the two spaced apart reinforcement parts are respectively disposed on two edge portions of the substrate part, and each of the two reinforcement parts comprises:
a reinforcement plate part facing the circuit board;
a reinforcement coupling part extended from the reinforcement plate part toward the circuit board; and
a reinforcement connection part extended from the reinforcement plate part toward the key accommodation part,
wherein the reinforcement connection part of one of the two reinforcement parts is coupled to the key accommodation part,
wherein the reinforcement coupling parts of the two reinforcement parts are each coupled to the circuit board, and the reinforcement plate parts of the two reinforcement parts are each spaced apart from the circuit board.

8. The smart key for a vehicle of claim 7, wherein the length of each of the two reinforcement parts is 20% to 60% of a length of the circuit board.

* * * * *